United States Patent Office 2,773,771
Patented Dec. 11, 1956

2,773,771

SYNERGISTIC COMPOSITIONS OF MATTER COMPRISING THE ALCOHOL-SOLUBLE MOIETY OF VEGETAL LECITHIN

Percy L. Julian, Oak Park, Herbert T. Iveson, Elmhurst, and Sol B. Radlove, Chicago, Ill., assignors to The Glidden Company, Cleveland, Ohio, a corporation of Ohio No Drawing. Application June 5, 1952,
Serial No. 291,974

11 Claims. (Cl. 99—15)

This invention relates to novel compositions of matter and more particularly to compositions comprising the alcohol-soluble moiety of vegetable phosphatides of improved emulsifying and other surface-active properties. Especially, our invention provides synergistic mixtures comprising a minor amount of the alcohol-soluble moiety of vegetable phosphatides and a major amount of a modified vegetable oil carrier.

It is known that the mixtures of phosphatides derived from vegetable sources, particularly from soya beans, corn, peanuts and the like, and commonly called "lecithin," are effective surface-active agents in a wide variety of applications. The "lecithin" is in reality a complex mixture containing, in addition to the chemical entity lecithin, such other constituents as cephalin, inositol phosphatides, carbohydrates, etc. The composition of the crude "lecithin" varies according to its source and the processing steps used in its isolation. Although usable in the crude state, in a number of instances the results obtained leave much to be desired. The deficiency in surface activity is due largely to the presence, in the crude lecithin, of substances capable of stabilizing water-in-oil emulsions as well as others capable of stabilizing oil-in-water emulsions. Both types of surface-active agents being present in intimate mixture in the crude "lecithin" accordingly may, in specific instances, oppose each other. The net result, therefore, when crude "lecithin" is used as a surface-active agent, is a relatively unstable composition.

In co-pending application Serial No. 232,868, filed June 21, 1951, a procedure for separating the two antagonistic moieties of crude "lecithin" is disclosed. This method, which is based upon the solubility of the moieties in hydroxylated aliphatic solvents, results in the separation of the crude "lecithin" into an alcohol-soluble fraction or moiety, which has been found effective as an emulsifier for oil-in-water emulsions, and an alcohol-insoluble moiety effective as an emulsifier for water-in-oil emulsions. Methods are disclosed therein for enhancing the effectiveness and ease, and range of applicability of the isolated moieties. These methods consist essentially of dissolving and/or dispersing the isolated moieties in a variety of carriers, the amount of carrier being at most, less than fifty percent by weight of the moiety present.

We have now found that when certain of the carriers disclosed in the aforementioned co-pending application are admixed with an effective amount up to fifty percent by weight of the alcohol-soluble moiety of crude "lecithin," the resulting mixtures exhibit synergistic improvements in surface-active properties over the properties of the individual ingredients in the mixture. For example, we have found this surprising improvement to result from: mixtures of minor amounts of the alcohol-soluble moiety with major amounts of (1) hydroxylated vegetable oils, the latter being such as are described in co-pending application Serial No. 283,248, filed April 19, 1952 and have been hydroxylated in the presence of a lower hydroxy carboxylic acid until the iodine value has been reduced at least 20 units, or (2) mixtures of mono- and diglycerides. The latter are available commercially under the trade names of "Promofat" (Procter and Gamble) and "SGF" (Durkee Famous Foods). Such mixtures usually contain (in precent by weight) approximately forty percent mono-, fifty percent di-, and ten percent triglyceride components.

Such glycerides contain various fatty acids such as stearic, palmitic, oleic, linoleic and isolinoleic when made from hydrogenated cottonseed and/or soya oils. Suitable mixtures can also be made from partially-hydrogenated or liquid soya or cottonseed oils, as well as from palm oil or from liquid or hydrogenated oils of the coconut oil group, e. g., coconut, palm kernel and babassu. Thus such monoglycerides and diglycerides as glycerol monostearate, glycerol monooleate, glycerol dilaurate, and glycerol oleostearate may be used alone or in various admixtures. Likewise an emulsifier of the type disclosed in co-pending application Serial No. 201,226, filed December 16, 1950, now Patent No. 2,690,971, can be used as the carrier either alone or in admixture with glycerides of the types just mentioned.

Esters of sorbitol, mannitol or inositol, such as the commercially obtainable long chain fatty acid partial esters of anhydrides of hexahydric alcohols also can be used as synergistic carriers in major amounts.

The surprising improvement in surface-active properties which characterizes our novel compositions is illustrated by a test devised by Dr. H. Bradley of the American Institute of Baking. This test is designed to measure the ability of an emulsifier to inhibit the dissolution of the amylose component of wheat starch, and is conducted in the following manner:

A 2.5 gram portion of wheat starch is suspended in fifty milliliters of a 0.25 percent aqueous solution of the emulsifier under test. The resultant suspension is heated at 60–70° C. for 15 minutes, while gently agitating the mixture. Thereafter it is poured into a graduated cylinder and permitted to settle for four hours. The volume of the sediment is measured and taken as an indication of the effectiveness of the emulsifier. The more efficient the emulsifier, the smaller is the volume of gelatinized starch obtained and, hence, the greater is the power of the emulsifier in inhibiting the dissolution of amylose.

This test was applied to the following mixtures to measure the effectiveness of varying proportions of the alcohol-soluble moiety of vegetable lecithin ("ASL") and the indicated carriers.

| Emulsifier | | Volume of Gelatinized Starch, cubic centimeters |
|---|---|---|
| Identity | Weight percent | |
| Water (control) | | 38 |
| "SGF" | .25 | 38 |
| "ASL" | .25 | 42 |
| Crude "Lecithin" | .25 | 42 |
| 10% "ASL"+90% "SGF" | .25 | 25 |
| 20% "ASL"+80% "SGF" | .25 | 25 |
| 50% "ASL"+50% "SGF" | .25 | 38 |
| 70% "ASL"+30% "SGF" | .25 | 42 |
| 20% Crude "Lecithin"+80% "SGF" | .25 | 35 |

As can be seen from the above data, crude "lecithin," the alcohol-soluble moiety of lecithin and the "SFG" are ineffective when used alone, but mixtures of the alcohol-soluble moiety and "SFG" in which the proportion of the former is less than fifty percent, are surprisingly effective. From this data, it is concluded that the "SFG" exerts a synergistic effect upon the alcohol-soluble moiety of vegetable phosphatides.

Mixtures of "ASL" with hydroxylated vegetable oils, the latter having been prepared as disclosed in co-pending application Serial No. 283,248, supra, also exhibit this synergistic effect of the two components.

| Emulsifier | | Volume of Gelatinized Starch, cubic centimeters |
|---|---|---|
| Identity | Weight percent | |
| Hydroxylated oil alone | .25 | 40 |
| 30% Oil+70% "ASL" | .25 | 42 |
| 44% Oil+56% "ASL" | .25 | 42 |
| 58% Oil+42% "ASL" | .25 | 40 |
| 72% Oil+28% "ASL" | .25 | 30 |
| 86% Oil+14% "ASL" | .25 | 32 |

Using sorbitan monooleate ("Span 80") as the carrier for the alcohol-soluble moiety, the synergistic effect of the compositions within the scope of the present invention is demonstrated in the following data.

| Emulsifier | | Volume of Gelatinized Starch, cubic centimeters |
|---|---|---|
| Identity | weight percent | |
| "Span 80" alone | 0.25 | 29 |
| 30% "Span 80"+70% "ASL" | 0.25 | 41 |
| 47.5% "Span 80"+52.5% "ASL" | 0.25 | 41 |
| 65% "Span 80"+35% "ASL" | 0.25 | 25 |
| 74% "Span 80"+26% "ASL" | 0.25 | 23 |
| 82.5% "Span 80"+17.5% "ASL" | 0.25 | 26 |

In like manner mixtures of minor amounts of alcohol-soluble lecithin with major amounts of sorbitan monooleate (Span 40) or sorbitan monostearate (Span 60) or sorbitan monolaurate (Span 20) exhibit comparable synergistic effects when tested by the Bradley test.

The novel compositions of our invention, because of their surprising improvement in surface activity, are useful in emulsifiers, especially applicable in edible products, particularly in high ratio cakes and in bread.

In the art of cake-baking, it is known that the ratio of sugar to flour largely determines the moisture retention, sweetness, tenderness and, generally, the acceptance of the product. Accordingly, a sugar/flour ratio as high as possible is desirable. However, as this ratio approaches or exceeds unity, the finished cake tends to become smaller in volume (i. e., is more prone to fall) and is heavier in texture. This tendency of high (sugar/flour) ratio cakes to "fall" has been more or less overcome by the use of relatively large proportions of expensive emulsifiers, which are believed to supplement the ability of the flour to stabilize the emulsion of the shortening and water.

We have now found that this tendency of high-ratio cakes to fall can be successfully overcome by the use of a synergistic composition comprising the alcohol-soluble moiety of crude "lecithin" in minor amount and a carrier of the type disclosed hereinabove in major amount.

The utilization of our novel compositions in the baking of bread results in bread of superior texture, excellent taste and flavor characteristics, and improved keeping qualities.

Further, we have found that the addition of the novel compositions of our invention to ice cream mixes results in products of improved texture and other characteristics.

The following examples will illustrate our invention:

EXAMPLE 1

*Preparation of A. S. Lecithin in "SGF" carrier*

A 75 percent alcohol solution containing 363 g. of the alcohol-soluble moiety of vegetable phosphatides, prepared from soybean "lecithin," as described in co-pending application Serial No. 232,868, supra, was mixed with 1452 g. of "SGF." The alcohol was evaporated under reduced pressure while heating the mixture on a steam bath. The resultant mass was a colored viscous fluid. By bleaching the mixture with 1.5 percent 27% hydrogen peroxide at 55° C. under vacuum (to remove moisture) for about sixteen hours, the color of the mass was markedly reduced. This product, when used in the manufacture of bread, gave an improved dough (i. e., better emulsion and more thorough penetration of the gluten by the liquid components of the mix), and resulted in a bread product which was more uniform in texture and appearance than one prepared without the addition of this emulsifier. In place of "SGF," hydroxylated oils, e. g., hydroxylated soybean oil, such as are prepared in co-pending application Serial No. 283,248, supra, can be used.

EXAMPLE 2

Several mixtures of alcohol-soluble lecithin and "SGF" of varying composition were used as emulsifiers in the preparation of a 140 percent white layer cake. The following table lists the results obtained therewith.

| Emulsifier | Wt. percent | Sp. Gr. of Batter | Volume | Displacement, cc. |
|---|---|---|---|---|
| 70% "ASL"+30% "SGF" | 5 | 1.06 | 1,225 | 955 |
| 50% "ASL"+50% "SGF" | 5 | 1.04 | 1,270 | 980 |
| 20% "ASL"+80% "SGF" | 5 | 0.985 | 1,340 | 1,030 |
| 70% "ASL"+30% "SGF" | 3 | 1.023 | Failure | 890 |
| 20% "ASL"+80% "SGF" | 3 | 0.903 | 1,345 | 1,070 |

The 140 percent (sugar/flour) high ratio white layer cake is a commercial type cake and is prepared as follows:

12½ ounces of flour and 10 ounces of shortening are mixed for seven minutes at low speed in a Hobart mixer. Then 28 ounces of sugar
7½ ounces of flour
¾ ounce of salt
35.5 grams of baking powder
2½ ounces of powdered milk
10 ounces of water are added, and the mass is mixed for two minutes at low speed. After adding 16 ounces of egg white, the mass is mixed for two minutes at low speed. Then 7½ ounces of water and ¼ ounce of vanilla are creamed into the batter at low speed in four minutes. The resultant batter is sufficient for 6 eight-inch layers. The layers are baked in a 365° oven for twenty minutes.

EXAMPLE 3

The effectiveness of other of our novel compositions in a different type of cake mix, specifically a 133 percent household type, high ratio cake mix, is demonstrated by the following results.

| Emulsifier | Wt. Percent | Volume per pound, ml. |
|---|---|---|
| A | | |
| 73.5% of mixture (50% hydroxylated linseed oil of IV=19.0 and 50% hydroxylated soya oil of IV=21.0). 18.3% A. S. Lecithin 8.2% Creamtex plasticized shortening | 1.1 | 1,375 |
| B | | |
| 80% hydroxylated linseed oil (IV=19.0) 16.5% A. S. Lecithin 16.5% Creamtex plasticized shortening | 1.2 | 1,385 |
| C | | |
| 80% "SGF" plus 20% A. S. Lecithin | 2.0 | 1,370 |
| D | | |
| 80% Formic acid hydroxylated soya oil (IV=2.3) plus 20% A. S. Lecithin | 2.0 | 1,275 |

The batters listed in this example were prepared using typical Durkee Household Formula for 133 percent high ratio (sugar/flour) cake. The following recipe was used.

7¼ ounces of flour
10¼ ounces of sugar
3½ ounces of shortening (into which the emulsifier has been blended)
¼ ounce of salt
5½ ounces of milk These ingredients were mixed for two minutes using a Sunbeam Mixmaster at speed No. 5. Thereafter 3 ounces of milk, 4½ ounces of egg white, and ¼ ounce of vanilla flavoring were added, and the batter mixed for two minutes longer at this same speed.

The batter was examined and then 15 ounces were weighed into eight-inch baking pans. After being baked in a 365° F. oven for twenty to twenty-one minutes, and being cooled for two hours, the cake (in duplicate) was weighed and the volume determined (average of two layers). From this data the volume/pound ratio was calculated.

EXAMPLE 4

In order to determine the effect of concentration of the emulsifier upon the volume of cake resulting from its use, several cakes were prepared using the household 133 percent formula described above. The emulsifier used was a mixture composed, by weight, of 80 percent soya oil which had been hydroxylated to an iodine value of about 20, and 20 percent A. L. Lecithin. The emulsifier was blended into the shortening as a matter of convenience, although it can be added directly, or incorporated in the milk or egg whites.

Two percent of the emulsifier (based on the shortening weight) gave a cake having a volume of 1390 ml. per pound. 1.5 percent of the emulsifier gave a cake having a volume of 1375 ml. 1.0 percent of the emulsifier gave a cake having a volume of 1350 ml. The cakes had nice, peaked tops, were lightly browned, and possessed a texture which was moist, light and tender.

From the above examples, it will readily be seen that the synergistic effect of the disclosed group of carriers, when admixed with less than 50 percent of their weight of the alcohol-soluble moiety of vegetable phosphatides, gives rise to compositions useful, because of their surprisingly improved surface-active properties, as additives to various food products. Our invention, however, is not to be limited, other than as indicated in the appended claims, to the particular compositions disclosed. For example, the phosphatide moiety of other than soy beans can be used as the source of the alcohol-soluble moiety. Such sources as corn, peanut, and the like can be used. Further, other carriers than those disclosed hereinabove can be employed. Any substance or mixture of substances possessing both hydrophilic and lipophylic groups which, when admixed with a minor amount, i. e. less than 50 percent by weight of the alcohol-soluble moiety of vegetal phosphatides, will give a volume of gelatinized starch of not more than 40 cc. in the Bradley amylose test hereinabove described, can be used as the carrier of our novel compositions.

Having described our invention, what we claim is:

1. As a composition of matter, a synergistic emulsifier mixture composed by weight of 10-35% of the alcohol-soluble moiety of vegetable lecithin, balance substantially all at least one substance having hydrophylic and lipophylic groups and selected from the group consisting of mixtures of mono- and di-glycerides, vegetable oils which have been hydroxylated in the presence of a lower hydroxy carboxylic acid until the iodine value has been reduced at least 20 units, and long chain fatty acid partial esters of anhydrides of hexahydric alcohols, said mixture giving a volume of gelatinized starch of not more than 40 milliliters in the Bradley amylose test, and being substantially free of the alcohol-insoluble moiety of vegetable lecithin.

2. A composition as claimed in claim 1 wherein said substance having hydrophylic and lipophylic groups consists essentially of at least one sorbitan partial ester.

3. A composition as claimed in claim 1 wherein the substance having hydrophylic and lipophylic groups consists essentially of vegetable oil which has been hydroxylated in the presence of a lower hydroxy carboxylic acid until the iodine value has been reduced at least 20 units.

4. A composition as claimed in claim 1 wherein said substance having hydrophylic and lipophylic groups consists essentially of a mixture of mono- and diglycerides.

5. A composition as claimed in claim 4 wherein said substance consists essentially of a composition composed of about 40 percent monoglycerides, 50 percent diglycerides and 10 percent triglycerides.

6. As a composition of matter, a synergistic emulsifier mixture composed by weight of about 20% of the alcohol-soluble moiety of vegetable lecithin, balance substantially all of at least one substance having hydrophylic and lipophylic groups selected from the group consisting of mixtures of mono- and di-glycerides, vegetable oils which have been hydroxylated in the presence of a lower hydroxy carboxylic acid until the iodine value has been reduced at least 20 units, and long chain fatty acid partial esters of anhydrides of hexahydric alcohols, said mixture giving a volume of gelatinized starch of not more than 40 milliliters in the Bradley amylose test, and being substantially free of the alcohol-insoluble moiety of vegetable lecithin.

7. A composition as claimed in claim 6 wherein said substance having hydrophylic and lipophylic groups consists essentially of at least one sorbitan partial ester.

8. A composition as claimed in claim 7 wherein said substance consists of sorbitan monooleate.

9. A composition as claimed in claim 6 wherein the substance having hydrophylic and lipophylic groups consists essentially of vegetable oil which has been hydroxylated in the presence of a lower hydroxy carboxylic aicd until the iodine value has been reduced at least 20 units.

10. A composition as claimed in claim 6 wherein said substance having hydrophylic and lipophylic groups consists essentially of a mixture of mono- and diglycerides.

11. A composition as claimed in claim 10 wherein said substance consists essentially of a composition composed of about 40 percent monoglycerides, 50 percent diglycerides and 10 percent triglycerides.

References Cited in the file of this patent

UNITED STATES PATENTS

| Number | Name | Date |
| --- | --- | --- |
| 1,667,767 | Bollmann | May 1, 1928 |
| 2,089,470 | Epstein et al. | Aug. 10, 1937 |
| 2,132,701 | Richardson et al. | Oct. 11, 1938 |
| 2,402,690 | Stanley | June 25, 1946 |
| 2,422,486 | Johnston | June 17, 1947 |
| 2,444,984 | Fitzpatrick | July 13, 1948 |
| 2,509,414 | Barsky | May 30, 1950 |